United States Patent [19]

Ifejika

[11] Patent Number: 5,129,410
[45] Date of Patent: Jul. 14, 1992

[54] APPARATUS AND A METHOD FOR CLEANING CONTACT LENSES

[76] Inventor: Charles Ifejika, 49 Donaldson Road, London NW6 6NE, England

[21] Appl. No.: 458,638
[22] PCT Filed: Jul. 18, 1988
[86] PCT No.: PCT/GB88/00573
§ 371 Date: Jan. 16, 1990
§ 102(e) Date: Jan. 16, 1990
[87] PCT Pub. No.: WO89/00429
PCT Pub. Date: Jan. 26, 1989

[30] Foreign Application Priority Data

Jul. 17, 1987 [GB] United Kingdom ............ 8716886

[51] Int. Cl.⁵ .................................... B08B 3/12
[52] U.S. Cl. .................................... 134/32; 134/1; 134/184; 134/901
[58] Field of Search ................ 134/184, 901, 32, 1

[56] References Cited

U.S. PATENT DOCUMENTS

| | | | |
|---|---|---|---|
| 3,614,959 | 10/1971 | Schollmaier et al. | 134/901 |
| 4,597,399 | 7/1986 | Rabenau et al. | 134/184 |
| 4,653,519 | 3/1987 | Kanner | 134/140 |
| 4,691,725 | 9/1987 | Parisi | 134/184 |
| 4,776,360 | 10/1988 | Ching Shih | 134/140 |
| 4,852,594 | 8/1989 | Chen | 134/901 |
| 4,907,613 | 3/1990 | Litzaw | 134/901 |
| 4,957,128 | 9/1990 | Chen | 134/901 |

FOREIGN PATENT DOCUMENTS

| | | | |
|---|---|---|---|
| 0126665 | 11/1984 | European Pat. Off. | 134/901 |
| 0178750 | 4/1986 | European Pat. Off. | 134/901 |
| 2570513 | 9/1984 | France | 134/901 |
| 1484945 | 9/1977 | United Kingdom . | |
| 89/00429 | 1/1989 | World Int. Prop. O. | 134/901 |

Primary Examiner—Asok Pal
Attorney, Agent, or Firm—Merchant, Gould, Smith, Edell, Welter & Schmidt

[57] ABSTRACT

A rotating agitational device, upon which is mounted a case (14) containing at least one lens and lens cleaning fluid, is electrically driven in a figure eight motion. This causes the contact or each lens to move about rapidly and clean itself automatically in a time of up to 60 seconds. The frequency of the agitations is between 10 and 100 Hz and is preferably between 35 and 45 Hz.

19 Claims, 1 Drawing Sheet

APPARATUS AND A METHOD FOR CLEANING CONTACT LENSES

BACKGROUND OF THE INVENTION

It is known that ultrasonic vibrations can be used to clean and help sterilize soft contact lenses. Firstly an ultrasonic device is used to produce sound frequency vibrations which are then transmitted into a tank means containing soft contact lenses and lens cleaning fluid and the contact lenses appear to remain virtually stationary.

The ultrasonic device generates an unseen wave of highly accelerated cleaning molecules which continuously bombard the lens surface. The contact lenses do not appear to move, nevertheless, an imperceptible scrubbing action is created which helps to remove proteins, mucins and other deposits from the lens surface. GB-A-1484945 discloses such a device which also uses heat disinfection to complete the process. However such a process is fairly time consuming and the device may prove too costly for general public use.

Electro-mechanical means may be used to produce high energy vibrations which can be employed to much the same effect as sound vibrations in an ultrasonic device. The high energy device once again transmits its vibrations into tank means. This generates an unseen wave of cleaning molecules to clean the surface of the lens. As one can observe, the lens cleaning fluid and the contact lenses will appear to remain virtually stationary throughout the entire process. Although such a device would be less expensive to produce, the cleaning time will still be relatively long such as 12-13 minutes. There is also a question as to whether such subtle devices can successfully remove dirt and other foreign bodies adhering to the lens.

The present invention provides a convenient, safe, but more important, quick and effective method of cleaning contact lenses. There is provided a cleaning apparatus for cleaning contact lenses, comprising an electrically operated motor, a support arm, vibration generating means operating within a frequency range of 10 to 100 Hz, preferably 20 to 45 Hz, more preferably 35 to 45 Hz, and tank means for receiving contact lens fluid. A contact lens holder receives the contact lenses and communicates with the tank means to enable unimpeded transfer of cleaning fluid therebetween. The holder is directly coupled to the motor by means of the support arm which is drivable by the motor to impart reciprocating motion to the holder in a rotational or linear sense. The vibration generating means, is operable during the reciprocating motion such that vibration is imparted to the contact lenses simultaneously with the reciprocating motion.

In one embodiment, the electric motor will provide a linear reciprocating agitation at its output. The agitation may be slow or a rapid movement thus a rheostat or speed control may be comprised in the cleaning apparatus. The motion in the tank means, whether linear, i.e., side to side or rotary, causes the contact lenses to move about and wash themselves automatically in the lens cleaning fluid.

Conveniently, said tank means define a pair of discrete tanks, each for receiving an individual contact lens. Alternatively, there may be a single tank chamber divided into two separate regions or with two central perforated baskets each of which is to hold an individual contact lens. A sponge or polystyrene attachment may be present in the tank means such that an abrasive rubbing action will be imparted to the contact lenses whilst the machine is in operation. A heating element may also be present in the tank means to provide heat disinfection once the lenses have been cleaned.

The process hereby disclosed is particularly advantageous to people with busy schedules as the process may be achieved in about 30 to 60 seconds when operating at a vibrational frequency of 20 to 45 Hz. An operating frequency of 35 to 45 Hz is most preferred.

The apparatus comprises tank means for receiving at least one lens, said tank means defining a discrete region for receiving each lens. With a lens disposed in such a region and an appropriate cleaning fluid in the tank means, thorough cleaning of the lens is effected.

Preferably, said electrical agitating means is adapted to be powered by an A.C. mains supply for which purpose it incorporates a transformer and a rectifier. The transformer automatically responds to the level of the power supply and regulates the supply of power to the electrically operated motor accordingly, so as to provide the correct level of voltage to the electrical motor or rechargeable battery. This will enable the apparatus to be used either with a 110 volt A.C. supply or a 210-240 volts A.C. supply.

Conveniently said tank means are removably mounted upon a drive output from the electrically operated motor.

Alternatively to powering the motor from a mains supply, said electrical agitation means may be adapted to be powered by a battery thus enabling its use remote from a power supply.

The battery may be rechargeable and may be adapted to be recharged, with rectification, via said transformer.

Preferably, said electrical agitating means includes a timer such that the motor operates for a predetermined length of time after being switched on before being switched off automatically.

The present invention also provides a method for cleaning at least one contact lens, said method comprising the steps of charging lens receiving tank means with contact lens cleaning fluid, inserting said at least one contact lens into the cleaning fluid, supporting the tank means on a support arm drivable by an electrically operated motor to subject the at least one contact lens to reciprocating motion in a rotational or linear sense, imparting vibration to the at least one contact lens at a frequency of 10 to 100 Hz, preferably 20 to 45 Hz, more preferably 35 to 45 Hz, simultaneously with said reciprocating motion thereby to effect cleaning of the at least one lens. Subsequently, removing each lens from the tank means.

Said method may comprise the additional step of sealing the tank means after insertion of the lenses into the cleaning fluid prior to agitating the tank means.

The electrically operated motor providing agitation may, for example, comprise an electric arrangement or a cam arrangement or may comprise a coil supplied with an A.C. current and a core which is sequentially attracted to and repelled by the coil as the flow of current is repeatedly reversed. In any event the agitator provides a reciprocating action. This reciprocating action is transferred to the tank means and thus will shake the tank means and the contents thereof vigorously.

BRIEF DESCRIPTION OF DRAWINGS

The invention is described further with reference to the accompanying drawings in which.

Figure 1:
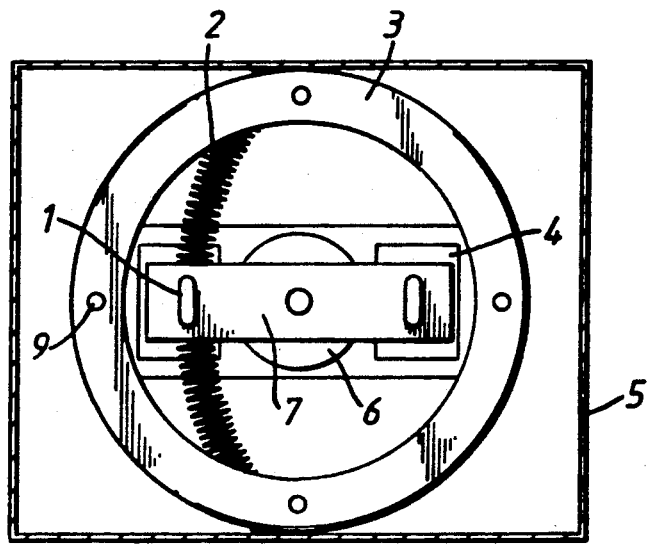
FIGS. 1 and 2 are respectively plan and side views of apparatus embodying this invention for cleaning contact lenses with rotational agitation. In the drawings, the reference numerals are as follows:
1. Support for contact lens case
2. Spring mechanism
3. Supporting wheel
4. Rechargeable batteries compartment
5. Motor housing
6. Arm support
7. Arm of drive mechanism
8. Attracting and repelling magnets
9. Wheel screws
10. Coil for A.C. current
11. Mains terminal
12. Rechargeable battery terminal
13. Coil terminals
14. Storage case
15. Screw-on caps The storage case 14 has two concave recesses, access to each recess being via circular opening formed within the upper surface of the storage case. Each concave recess constitutes a dished tank within which a contact lens and contact lens cleaning fluid is received. A screw-on cap 15 is provided for each recess, the screw-on cap 15 is screwed onto a threaded boss and serves to close each concave recess.
Figure 2:
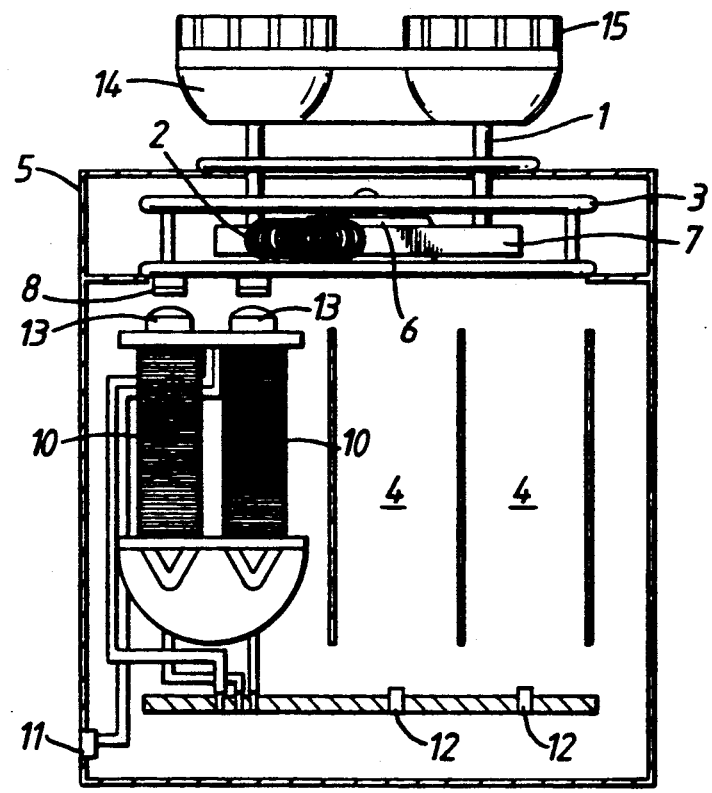

The agitator may comprise any form of electrical motor. As illustrated, it comprises an electric motor which provides a reciprocating motion via the arm 7. The arm 7 is received within the supporting wheel 3 and thus the rotational motion of the arm 7 is transferred to the storage case 14 and will thus shake the case 14 and the contents of the concave recess vigorously from side to side.

The agitator may be simply controlled by an on-off switch but, in a preferred embodiment, the agitator incorporates, in addition to an on-off switch, a timer so that, once the agitator has been switched on, the apparatus will run for a predetermined length of time and then subsequently switch itself off automatically.

The cleaning apparatus is very simple to use since it is only necessary to fill the tank means with cleaning fluid, place the contact lenses into their respective chambers, screw the caps into position and switch on the agitator. Once the apparatus has operated for a predetermined period of time, the agitator is then switched off and the lenses may then be removed from the cleaning fluid. Thus the apparatus requires little supervision and permits the operator to do something else whilst the lenses are being cleaned. The tank means or casing is removably mounted as to facilitate the filling of the chambers with fluid and to facilitate the insertion and removal of the lenses into and out of the chambers.

It will be appreciated that numerous modifications and alterations may be made to the present invention without departing from the scope thereof. Thus it would be possible to provide a casing which is designed to receive more than one pair of contact lenses. As previously mentioned the agitator may be of any suitable design, so long as it effects vigorous shaking of the casing. There may be a single tank chamber divided into two separate regions by a perforated screen or mesh. The cleaning apparatus comprises electrical means for vibrating the tank means, the vibrating means simultaneously with the reciprocating motion, so that the contact lenses move about and wash themselves automatically within the cleaning fluid provided. In general the frequency should be between 10 to 100 Hz and preferably between 35 to 45 Hz. In certain other embodiments the connection between the motor and the arm of the drive mechanism may comprise a gear train designed to reciprocate the arm. This gear train will allow the contact lens holder to agitate rotationally within the tank means.

I claim:

1. A cleaning apparatus for cleaning contact lenses, comprising:

tank means for receiving contact lens cleaning fluid;

vibration generating means operating within a frequency range of 10 to 100 Hz;

an electrically operated motor;

a contact lens holder for insertion therein of at least one contact lens, the contact lens holder communicating with the tank means to enable unimpeded transfer of cleaning fluid to take place therebetween; and a support arm, the contact lens holder being directly coupled to said motor by means of the support arm, the support arm being drivable by the motor to impart reciprocating motion to the holder within the tank means in one of a rotational or linear sense, said vibration generating means being operable during said reciprocating motion such that vibration is imparted to the at least one contact lens simultaneously with said reciprocating motion.

2. A cleaning apparatus according to claim 1, wherein said tank means defines a pair of discrete chambers, each for receiving an individual contact lens.

3. A cleaning apparatus according to claim 1, wherein said tank means comprises a pair of dishes tank regions, each dished tank region being provided with a closure.

4. A cleaning apparatus according to claim 3, wherein each closure is in the form of a screw-on cap, each dished tank region being provided with a threaded portion upon which the cap is received.

5. A cleaning apparatus according to claim 1, wherein said tank means has a single tank chamber divided into two separate regions by a screen or mesh.

6. A cleaning apparatus according to claim 1 wherein the electrically operated motor has a speed control for varying speed of movement of the tank means.

7. A cleaning apparatus according to claim 1, and additionally comprising a heating element to provide facilities for thermal disinfection of the at least one contact lens once the contact lens has been cleaned.

8. A cleaning apparatus according to claim 1, wherein the tank means has a sponge or polystyrene attachment against which said at least one lens rubs when the cleaning solution is in motion.

9. A cleaning apparatus according to claim 8, wherein said tank means is removably mounted upon an output from said electrically operated motor.

10. A cleaning apparatus according to claim 1, wherein said electrically operated motor is adapted to be powered by a mains supply and incorporates a transformer and a rectifier, said transformer automatically responding to the level of power supply and regulating the supply of power to the electric motor accordingly.

11. A cleaning apparatus according to claim 1, wherein said electrically operated motor is adapted to be powered by a battery, is rechargeable and is adapted to be recharged via a transformer and a rectifier.

12. A cleaning apparatus according to claim 1, further including a timer such that the electrically operated motor is operative for a predetermined time after being switched on, before being switched off automatically.

13. An apparatus according to claim 1, wherein said at least one contact lens is vibrated at a frequency of 20 to 45 Hz for 30 to 60 seconds.

14. An apparatus according to claim 1, wherein said at least one contact lens is vibrated at a frequency of 35 to 45 Hz.

15. An apparatus according to claim 1, wherein said tank means has a single tank chamber, said contact lens holder including two perforated baskets that can hold individual contact lenses.

16. A method for cleaning at least one contact lens, said method comprising the steps of:
 charging lens-receiving tank means with contact lens cleaning fluid;
 inserting said at least one contact lens into the cleaning fluid;
 supporting the tank means on a support arm;
 driving the support arm by means of an electrically operated motor to subject the at least one contact lens to reciprocating motion in one of a rotational or linear sense;
 imparting vibration to the at least one contact lens at a frequency of 10 to 100 Hz, simultaneously with said reciprocating motion to effect cleaning of said at least one contact lens; and
 removing the at least one contact lens from the tank means.

17. A method according to claim 16, wherein said vibration is imparted at a frequency of 20 to 45 Hz for 30 to 60 seconds.

18. A method according to claim 16, further comprising the step of sealing the tank means after insertion of the at least one lens into the cleaning fluid and prior to imparting reciprocating motion and vibration to the at least one contact lens.

19. A method according to claim 16, wherein said vibration is imparted to the tank means at a frequency of 35 to 45 Hz.

* * * * *